(12) United States Patent
Kawatsu

(10) Patent No.: US 10,477,035 B2
(45) Date of Patent: Nov. 12, 2019

(54) IMAGE READING APPARATUS, IMAGE FORMING SYSTEM, AND PROGRAM FOR IMAGE READING APPARATUS

(71) Applicant: KONICA MINOLTA, INC., Chiyoda-ku, Tokyo (JP)

(72) Inventor: Kenji Kawatsu, Kodaira (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/920,660

(22) Filed: Mar. 14, 2018

(65) Prior Publication Data

US 2018/0288235 A1 Oct. 4, 2018

(30) Foreign Application Priority Data

Mar. 30, 2017 (JP) ................................ 2017-067983

(51) Int. Cl.
*H04N 1/00* (2006.01)
*H04N 1/60* (2006.01)

(52) U.S. Cl.
CPC ..... *H04N 1/00023* (2013.01); *H04N 1/00013* (2013.01); *H04N 1/0066* (2013.01); *H04N 1/00087* (2013.01); *H04N 1/00615* (2013.01); *H04N 1/6044* (2013.01)

(58) Field of Classification Search
None
See application file for complete search history.

(56) References Cited

U.S. PATENT DOCUMENTS

| 2008/0056737 A1* | 3/2008 | Flemming | G03G 15/5062 399/15 |
| 2013/0135650 A1* | 5/2013 | Kuronuma | G06K 15/00 358/1.13 |
| 2014/0185047 A1* | 7/2014 | Tajima | G01J 3/46 356/402 |

FOREIGN PATENT DOCUMENTS

| CN | 103913970 A | 7/2014 |
| JP | 2014082679 A | 5/2014 |

OTHER PUBLICATIONS

Extended European Search Report issued in European Patent Application No. 18161191.4-1209, dated Aug. 6, 2018 (9 pages).

(Continued)

*Primary Examiner* — Frantz Bataille
(74) *Attorney, Agent, or Firm* — Buchanan Ingersoll & Rooney PC

(57) ABSTRACT

An image reading apparatus includes: a conveyor that conveys paper on which an image is formed along a conveyance path; a first guide member including a first opening on a reference surface opposed to the conveyance path that guides the conveyed paper; a first opposing member that arranges the image on the paper in a colorimetric range set in the first opening on the reference surface by pressing the reference surface via the paper to allow the paper to abut the reference surface; a second opposing member that presses the reference surface by a pressing surface including a calibrating member in a reference color to arrange the calibrating member in the colorimetric range; and a colorimeter arranged on a side opposite to the conveyance path across the first guide member that performs colorimetry on the image on the paper and the calibrating member arranged in the colorimetric range.

17 Claims, 12 Drawing Sheets

(56) References Cited

OTHER PUBLICATIONS

The State Intellectual Property Office of the People's Republic of China, The First Office Action dated May 24, 2019 for Application No. 201810270931.1 with English translation (30 pages).

* cited by examiner

IMAGE READING APPARATUS, IMAGE FORMING SYSTEM, AND PROGRAM FOR IMAGE READING APPARATUS

The entire disclosure of Japanese patent Application No. 2017-067983, filed on Mar. 30, 2017, is incorporated herein by reference in its entirety.

BACKGROUND

Technological Field

The present invention relates to an image reading apparatus, an image forming system, and a program for image reading apparatus.

Description of the Related Art

In recent years, an image forming device which forms an image on paper by an electrophotographic method is widely used.

In such image forming device, in order to maintain a color of the image with high precision, the image on the paper is read by a scanner and a feedback is performed for correcting an image forming condition so that the read image data is correct data. The image data read by the scanner is convened into data in the same color system as a colorimetric value by a colorimeter to be compared with the colorimetric value, so that the scanner is calibrated. The colorimeter is calibrated by comparing the colorimetric value obtained by colorimetry of the calibrating member in a reference color with a color value of the reference color.

Therefore, in order to maintain the color of the image on the paper with high accuracy, it is necessary that the colorimeter accurately perform colorimetry on the image on the paper and the calibrating member.

JP 2014-82679 A discloses the conventional art for accurately performing the colorimetry on the calibrating member. That is, the colorimeter is moved to a calibrating unit arranged outside a conveyance region for performing colorimetry of the conveyed paper, the calibrating member incorporated in the calibrating unit is brought close to the colorimeter to perform the colorimetry, and then the calibrating member is separated from the colorimeter, and a shutter is inserted between the calibrating member and the colorimeter. With such a configuration, colorimetric accuracy of the calibrating member is improved by bringing the calibrating member close to the colorimeter at the time of the colorimetry of the calibrating member. When the calibrating member is not subjected to the colorimeter, the calibrating member is covered with the shutter inserted between the calibrating member and the colorimeter, thereby being prevented from becoming dirty due to paper dust or the like.

However, in the conventional art, the colorimetry of the image on the paper and the colorimetry of the component are performed at different positions. In addition, when the colorimetry is performed on the calibrating member, the colorimeter is moved from the paper conveyance region to the arrangement position of the calibrating unit. It is therefore problematically difficult to set a distance between the paper and the colorimeter at the time of colorimetry of the image on the paper and a distance between the component and the colorimeter at the time of colorimetry of the calibrating member to be the same with high precision.

SUMMARY

The present invention has been made to solve the above problem. That is, it is an object of the present invention to provide an image reading apparatus capable of setting the distance between the paper and the calibrating member subjected to the colorimetry and the colorimeter the same with high precision.

To achieve the abovementioned object according to an aspect of the present invention, an image reading apparatus reflecting one aspect of the present invention comprises: a conveyor that conveys paper on which an image is formed along a conveyance path; a first guide member including a first opening on a reference surface opposed to the conveyance path that guides the conveyed paper, a first opposing member that arranges the image on the paper in a colorimetric range set in the first opening on the reference surface by pressing the reference surface via the paper guided by the first guide member to allow the paper to abut the reference surface; a second opposing member that presses the reference surface by a pressing surface including a calibrating member in a reference color to arrange the calibrating member in the colorimetric range; and a colorimeter arranged on a side opposite to the conveyance path across the first guide member that performs colorimetry on the image on the paper and the calibrating member arranged in the colorimetric range.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
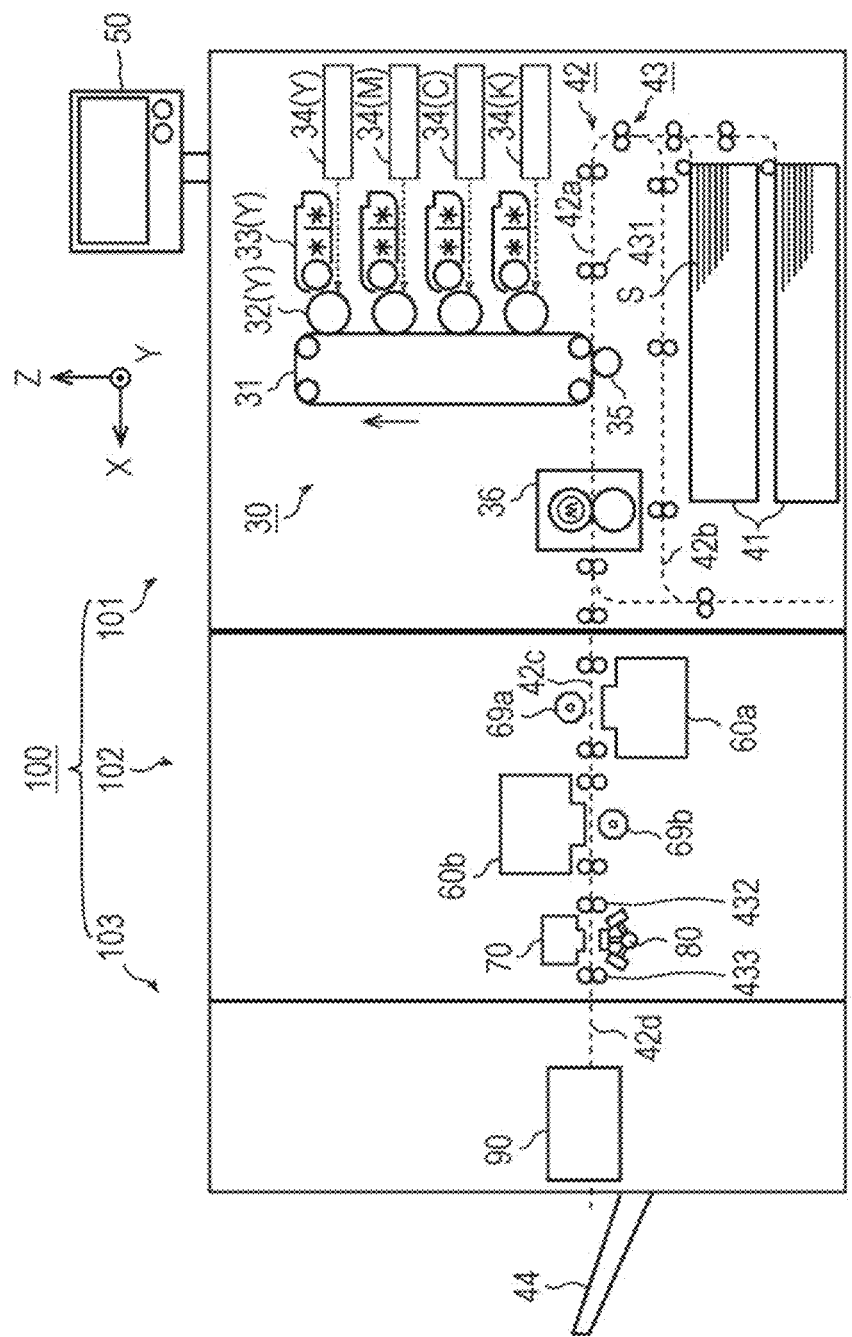
FIG. 1 is a view illustrating a schematic configuration of an image forming system.

Hereinafter, an image reading apparatus, an image forming system, and a program for image reading apparatus according to one or more embodiments of the present invention will be described in detail with reference to the drawings. However, the scope of the invention is not limited to the disclosed embodiments. Meanwhile, in the drawings, the same elements are assigned with the same reference sign, and the description thereof is not repeated. Also, dimensional ratios of the drawings are exaggerated for convenience of description and may differ from an actual ratio.

First Embodiment

Figure 2:
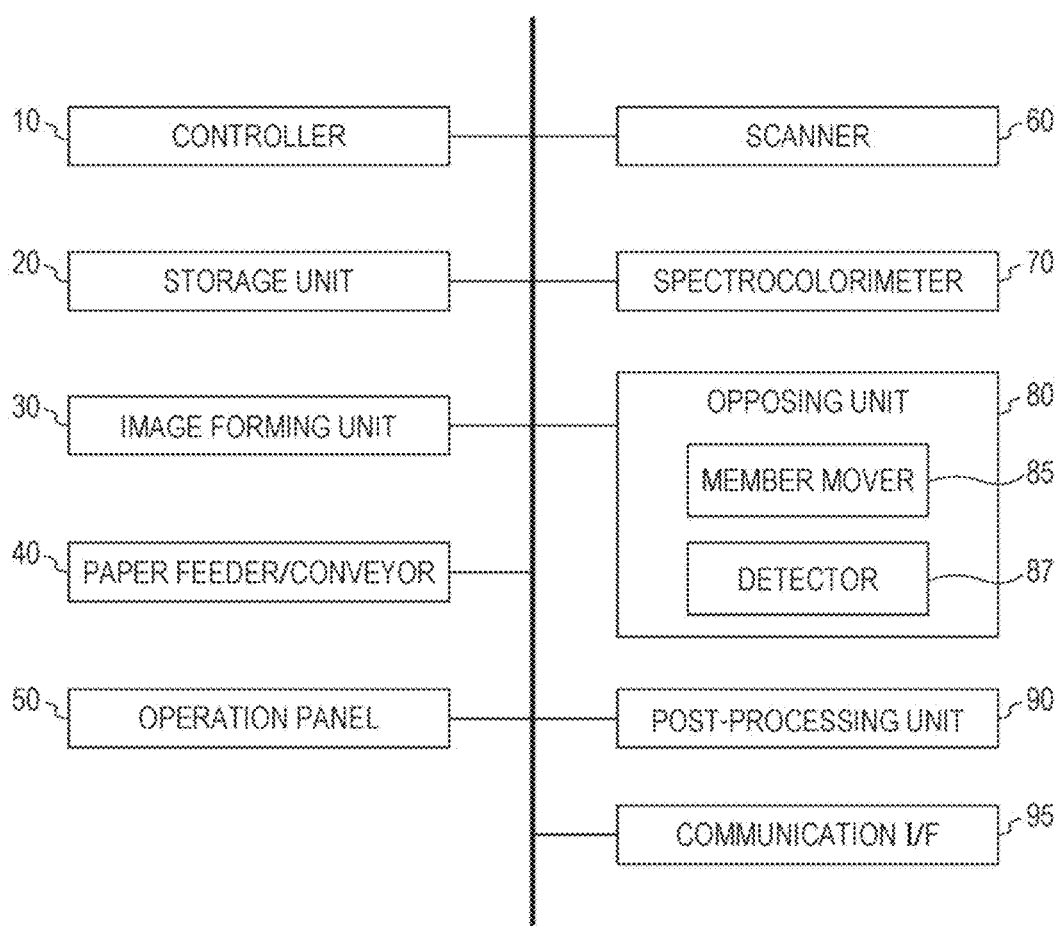
FIG. 2 is a block diagram illustrating a hardware configuration of the image forming system.

FIG. 1 is a view illustrating a schematic configuration of an image forming system according to a first embodiment of the present invention. FIG. 2 is a block diagram illustrating a hardware configuration of the image forming system.

An image forming system 100 includes an image forming device 101, an image reading apparatus 102, and a post-processing device 103.

The image forming system 100 includes a controller 10, a storage unit 20, an image forming unit 30, a paper feeder/conveyor 40, an operation panel 50, a scanner 60, a spectrocolorimeter 70, an opposing unit 80, a post-processing unit 90, and a communication interface 95 which are connected to one another via a bus for exchanging signals. The image reading apparatus 102 includes a plurality of scanners 60a and 60b and the spectrocolorimeter 70. The image forming device 101 forms an image on paper S. The image reading apparatus 102 reads the paper S on which the image is formed by the image forming device 101 and performs colorimetry. The post-processing device 103 performs post-processing of the paper S on which the image is formed by the image forming device 101.

The controller 10 formed of a central processing unit (CPU) controls each unit of the image forming system 100 and performs arithmetic processing according to a program. The program includes a control program for controlling the image reading apparatus 102.

The storage unit 20 includes a random access memory (RAM) which temporarily stores programs and data as a work area of the controller 10, a read only memory (ROM) which stores various programs and various data in advance, and a hard disc drive (HDD) which stores various programs including an operation system and various data. Image data of a patch image in a plurality of colors for calibrating the scanner 60 and image data of a patch image in a plurality of colors for adjusting an image forming condition by the image forming device 101 are stored in the storage unit 20.

The image forming unit 30 includes an intermediate transfer belt 31, a photosensitive drum 32, a developing unit 33, a writing unit 34, a secondary transfer unit 35, and a fixing unit 36. The photosensitive drum 32, the developing unit 33, and the writing unit 34 have configurations corresponding to respective colors of yellow (Y), magenta (M), cyan (C), and black (K); in FIG. 1, representation of a reference sign other than Y is omitted as for the photosensitive drum 32 and the developing unit 33.

The writing unit 34 exposes a surface of the photosensitive drum 32 which is charged on the basis of the image data to form an electrostatic latent image. The developing unit 33 develops the formed electrostatic latent image with toner to form a toner image in each color on the surface of each photosensitive drum 32. The images are sequentially overlapped on the intermediate transfer belt 31 by a primary transfer unit (not illustrated) of each color to form a full color toner image. After the toner image is transferred onto the paper S by the secondary transfer unit 35, this is heated and pressed by the fixing unit 36, thereby forming a full color image on the paper S. Meanwhile, the image forming unit 30 may further include an image processing unit that generates the image data by performing rasterizing processing on print data included in a print job.

The paper feeder/conveyor 40 includes a paper feed tray 41, a conveyance path 42 (42a to 42d), a plurality of conveyance rollers 43 (431 to 433), a driving motor (not illustrated) for driving the conveyance roller 43, and a paper discharge tray 44.

The paper feeder/conveyor 40 rotates the conveyance rollers 43 by driving of the driving motor, feeds the paper S from the paper feed tray 41 and conveys the same on the conveyance path 42.

The conveyance path 42 is formed of the conveyance paths 42a and 42b in the image forming device 101, the conveyance path 42c in the image reading apparatus 102, and the conveyance path 42d in the post-processing device 103.

The paper S fed from the paper feed tray 41 is conveyed on the conveyance path 42a. A registration roller 431 for adjusting a conveyance timing of the paper S by being rotated and stopped by a clutch is arranged on the conveyance path 42a.

The paper S conveyed on the conveyance path 42a on which the image is formed by the image forming unit 30 passes through the conveyance paths 42c and 42d on a downstream side where this is subjected to processing corresponding to print setting of the print job and is ejected outside the device to be arranged on the paper discharge tray 44.

If the print setting of the print job is duplex printing setting, the paper S on one surface of which the image is formed is conveyed to an auto duplex unit (ADU) conveyance path 42b of the image forming device 101. The paper S conveyed to the ADU conveyance path 42b is reversed by a switchback path and then joins to the conveyance path 42a to arrive at the image forming unit 30 where an image is formed on the other surface thereof.

The operation panel 50 is provided with a touch panel, a numeric keypad, a start button, a stop button and the like to which various settings such as printing conditions and various instructions are input. Also, the operation panel 50 displays various types of information.

The scanners 60 (60a and 60b) are arranged on the conveyance path 42c and read the image formed on the paper S conveyed from the conveyance path 42a on an upstream side. The scanners 60a and 60b are arranged on the conveyance path 42c across the conveyance path 42c so as to read the images on different surfaces of the paper S. In a case of the duplex printing setting, the scanner 60a reads the image formed on one surface of the paper S and the scanner 60b reads the image formed on the other surface thereof. In a case of single-sided printing setting, only the scanner 60b reads the image on the side of the surface on which the image is formed of the paper S.

The scanner 60 includes a sensor array, an optical system, a light emitting diode (LED) light source, a casing storing these components and the like.

The sensor array is a color line sensor in which a plurality of optical elements (for example, charge coupled devices (CCDs)) is linearly arranged in a main scanning direction, a reading area of which in a width direction corresponds to an entire width of the paper S. The optical system is formed of a plurality of mirrors and lenses. Light from the LED light source passes through a document glass and irradiates the surface of the paper S passing through a reading position on the conveyance path 42c. An image in this reading position is guided by the optical system and forms an image on a sensor array.

Back surface units 69a and 69b are arranged in positions opposed to the scanners 60a and 60b, respectively. Each of the back surface units 69a and 69b is rotatable polygonal columnar member having a polygonal (for example, hexagonal) cross-sectional shape, with a rotary shaft arranged in the main scanning direction of the scanners 60a and 60b. A white surface, a black surface, and a reference color surface for shading correction are formed on the surfaces of the polygonal column, and in a case of reading the image of the paper S, the white surface is opposed to the scanners 60a and 60b. It is positioned such that the black surface is opposed to the scanners 60a and 60b in a case of detecting an edge of the white paper S, and the reference color surface is opposed to the scanners 60a and 60b in a case of shading correction.

The spectrocolorimeter 70 is arranged on the conveyance path 42c. The spectrocolorimeter 70 performs the colorimetry on a patch image for calibration formed on the paper S by the image forming unit 30. Specifically, the spectrocolorimeter 70 spectrally measures the color of the patch image for calibration on the paper S and obtains a spectral reflection factor of respective wavelengths in a visible light region and its adjacent region. Colorimetric data may be output as a colorimetric value of a XYZ color system. As is to be described later, the patch image for calibration is also read by the scanner 60a or the scanner 60b, and the read image data is convened into data of the XYZ color system the same as the colorimetric value by the spectrocolorimeter 70. Then, by comparing both data and determining a correction value, the scanners 60a and 60b are calibrated.

A size and a shape of the colorimetric range (hereinafter referred to as a "colorimetric region a I") of the spectrocolorimeter 70 are, for example, a circle of 4 mm on a plane (XY plane) of the paper S. A distance (Z direction) is more than 10 mm (for example, 15 mm) from a lower surface of the spectrocolorimeter 70. Also, in a width direction, the colorimetric region a1 of the spectrocolorimeter 70 is set, for example, at the center of the paper S, and this range is included in a reading region of the scanners 60a and 60b.

The spectrocolorimeter 70 is provided downstream of the scanners 60a and 60b in a conveying direction on the conveyance path 42c. However, the spectrocolorimeter 70 may also be provided upstream of the scanners 60a and 60b in the conveying direction on the conveyance path 42c.

The post-processing unit 90 is provided on the conveyance path 42d. The post-processing unit 90 includes, for example, a stack unit in which the paper S is stacked and a staple unit, and after a plurality of sheets of paper S is stacked in the stack unit, the stapling unit performs side stitching processing using staples. A bundle of the side stitched paper S is ejected onto the paper discharge tray 44. Also, the paper S not subjected to side stitching are directly ejected via the conveyance path 42c.

Various local connection interfaces such as a network interface according to standards such as SATA, PCI ExpreS, USB, Ethernet (registered trademark), and IEEE 1394, a wireless communication interface such as Bluetooth (registered trademark) and IEEE 802.11 are used as the communication interface 95. The print job formed of the print data and the print setting is received from an external terminal such as a personal computer (PC) through the communication interface 95.

Figure 3:
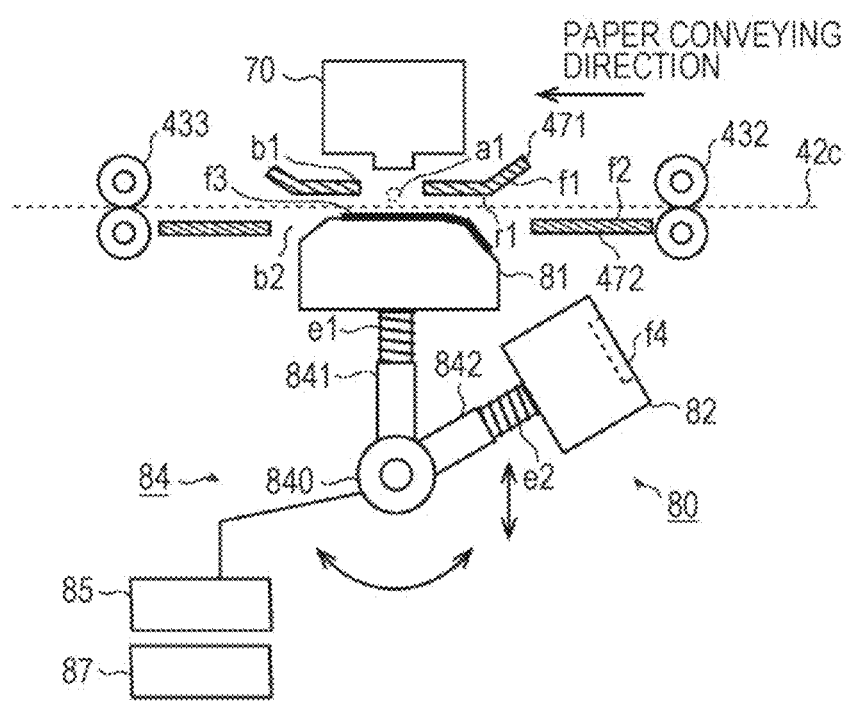
FIG. 3 is an explanatory view illustrating a configuration of a spectrocolorimeter and an opposing unit.
Figure 4:
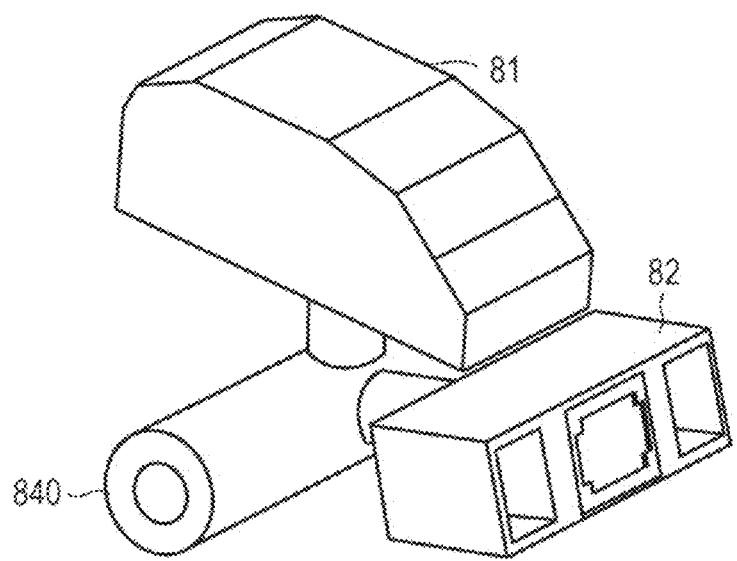
FIG. 4 is a perspective view illustrating a configuration of an opposing member and a rotary shaft included in the opposing unit.

With reference to FIGS. 3 and 4, a configuration of the opposing unit 80 is described. FIG. 3 is an explanatory view illustrating a configuration of the spectrocolorimeter and the opposing unit. FIG. 4 is a perspective view illustrating a configuration of an opposing member and the rotary shaft included in the opposing unit.

The opposing unit 80 includes a first opposing member 81, a second opposing member 82, a holding member 84 that holds them, a member mover 85, and a detector 87 that detects a position of the second opposing member 82.

The holding member 84 includes a rotary shaft 840, support columns 841 and 842, and elastic members e1 and e2. The elastic member e1 forms a first elastic member and the elastic member e2 forms a second elastic member. The first opposing member 81 and the second opposing member 82 are provided at tip ends of the support columns 841 and 842, respectively. The support column 841 is extendable and the first opposing member 81 provided on the support column 841 is biased toward a tip end side by the elastic member e1. Similarly, the second opposing member 82 is attached to the expandable support column 842 to be biased toward the tip end side by the elastic member e2. A first guide plate 471 and a second guide plate 472 forming a pair of guide members for guiding the paper S, that is, a first guide member and a second guide member are arranged across the conveyance path 42c. The first guide plate 471 and the second guide plate 472 arranged so as to be parallel to the conveyance path 42c at a predetermined interval (for example, 3 mm). Meanwhile, in a case where the first guide plate 471, the conveyance rollers 432 and 433 and the like may guide and convey the paper S, it is not required to provide the second guide plate 472.

An opening b1 forming a first opening is provided in a position of the first guide plate 471 corresponding to the colorimetric region a1 of the spectrocolorimeter 70. The opening b has, for example, a circular shape. A lower surface of the first guide plate 471 is a flat surface and forms a reference surface r1. The colorimetric region a1 is set in the opening b1 on the reference surface r1. Meanwhile, an inclined surface f1 for smoothly guiding the conveyed paper S may be provided in a portion other than the reference surface r1 of the lower surface of the first guide plate 471. An opening b2 forming a second opening is provided on an upper surface f2 of the second guide plate 472 opposed to the reference surface r1 at a predetermined interval (for example, 3 mm) across the conveyance path 42c. Specifically, the opening b2 is provided on the upper surface f2 of the second guide plate 472 in a position opposed to the opening b of the reference surface r1 across the conveyance path 42c.

The member mover 85 is formed of the driving motor and a transmitting mechanism including a gear and the like for transmitting power from the driving motor to the rotary shaft 840 (none of which is illustrated), and performs rotary movement and vertical movement of the holding member 84. Specifically, the member mover 85 rotates the rotary shaft 840 by a predetermined angle as the rotary movement and switches the opposing member arranged in a position opposed to the spectrocolorimeter 70. Also, after the rotary movement, the rotary shaft 840 is moved up and down to a first position close to the first guide plate 471 and a second position far from the first guide plate 471. As the rotary shaft 840 moves to the first position, the first opposing member 81 or the second opposing member 82 moves through the opening b2 to be arranged in a pressing position. The pressing position is the position of the first opposing member 81 and the second opposing member 82 when pressing the reference surface r1. As the rotary shaft 840 moves to the second position, the first opposing member 81 and the second opposing member 82 are arranged in a retracted position. The retracted position is the position of the first opposing member 81 and the second opposing member 82 separated from the colorimetric region a1 of the spectrocolorimeter 70 by being arranged on the opposite side of the first guide plate 471 across the conveyance path 42c. In FIG. 3, a state in which the first opposing member 81 and the second opposing member 82 are arranged in the retracted position, and the first opposing member 81 is opposed to the spectrocolorimeter 70.

Figure 5:
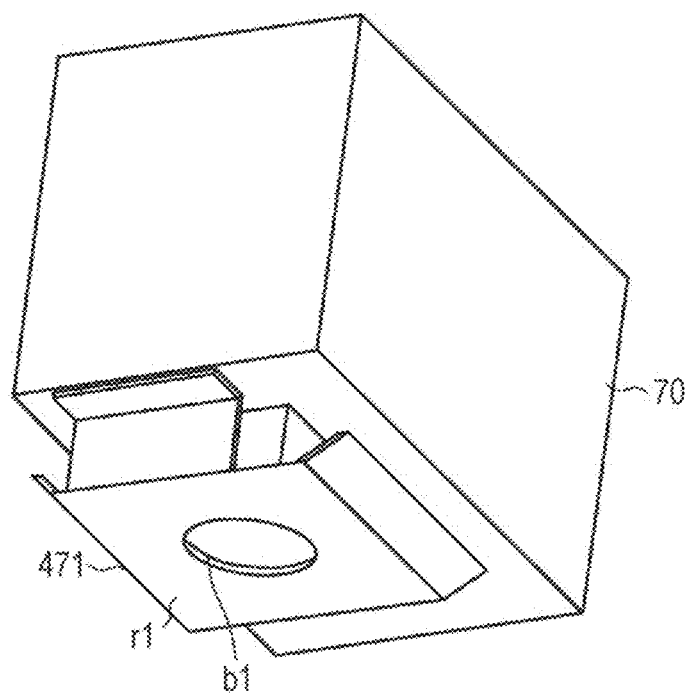
FIG. 5 is a perspective view of the spectrocolorimeter to which a first guide plate is attached.

FIG. 5 is a perspective view of the spectrocolorimeter to which the first guide plate is attached. The first guide plate 471 may be attached to the spectrocolorimeter 70. As a result, the distance between the spectrocolorimeter 70 and the reference surface r1 of the first guide plate 471 is relatively determined, so that the colorimetric range may be set within the opening b1 on the reference surface r1 with high accuracy.

Figure 6:
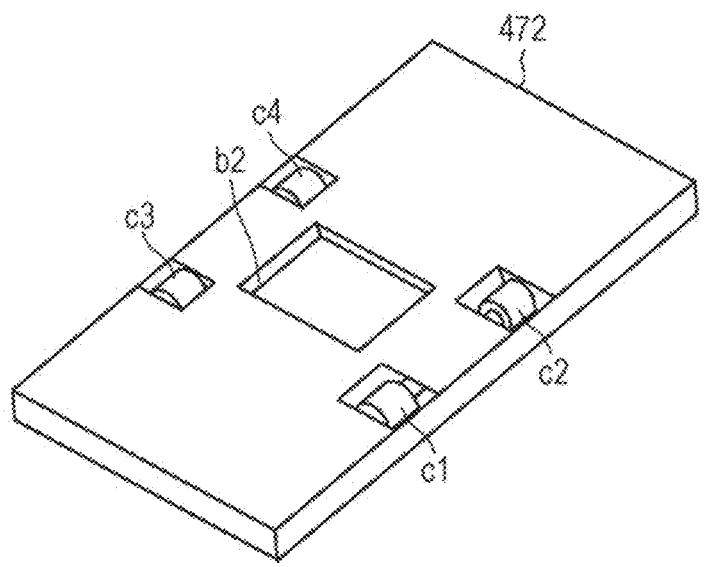
FIG. 6 is a perspective view of a second guide plate.

FIG. 6 is a perspective view of the second guide plate. A shape of the opening b2 may be, for example, a rectangle having a long side of 60 mm and a short side of 40 mm. In order to smoothly guide and convey the paper S, the second guide plate 472 may be provided with rollers c to c4 which rotate together with the paper S by contact.

Figure 7:
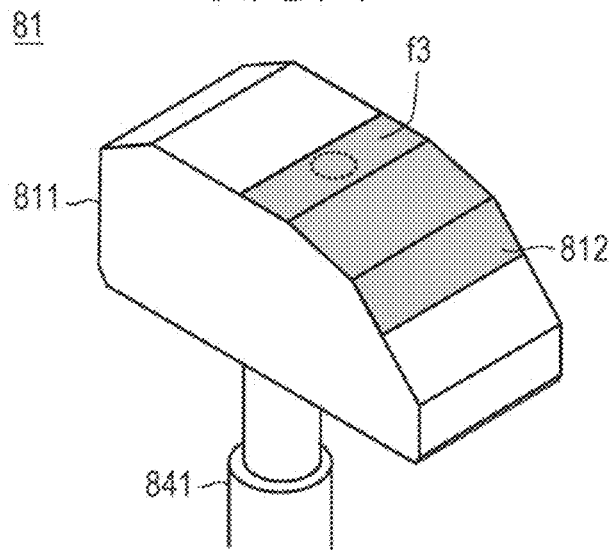
FIG. 7 is a perspective view of one example of a first opposing member.

FIG. 7 is a perspective view of one example of the first opposing member. The first opposing member 81 includes a base 811 engaged with the support column 841 and a back surface sheet 812 adhered to the base 811. The back surface sheet 812 has a background color used as a background at the time of colorimetry of the paper S by the spectrocolorimeter 70 by arranging the back surface sheet 812 on a side of the surface opposite to the surface on which the colorimetry is performed of the paper S. Since the paper S has various thicknesses, the back surface sheet 812 having the background color on the side of the surface opposite to the surface on which the colorimetry is performed of the paper S is arranged such that light applied to the paper S in the colorimetric region a1 from the spectrocolorimeter 70 passes through the paper S and reflected to be subjected to the colorimetry by the spectrocolorimeter 70. In FIG. 7 and the like, the back surface sheet 812 is illustrated in gray or black, but in reality, this may be a member close to white with a smooth surface. Meanwhile, it is also possible to apply the background color to the surface of the base 811 in place of using the back surface sheet 812. The first opposing member 81 presses the reference surface r1 via the paper S guided by the first guide plate 471. At that time, the first opposing member 81 presses the reference surface r1 with a surface having the back surface sheet 812 (surface having the background color) f3. As a result, the paper S abuts the reference surface r1, so that the surface subjected to the colorimetry is arranged in the colorimetric region a1. Also, the surface f3 having the back surface sheet 812 abuts the side of the surface opposite to the surface subjected to the colorimetry of the paper S. The surface f3 having the back surface sheet 812 may have a rectangular shape with a long side and a short side longer than a diameter of the circular opening b1, for example. That is, the surface f3 having the back surface sheet 812 is larger than the opening b1. However, if the surface f3 having the back surface sheet 812 has such a size and a shape that the surface 13 having the back surface sheet 812 may press the reference surface r1 without slipping through the opening b1 when trying to press the reference surface r1, there is no limitation. That is, the surface f3 having the back surface sheet 812 may have a rectangular shape with one of the long side and the short side longer than the diameter of the circular opening b1, for example. In FIG. 7, a position on the back surface sheet 812 opposed to the colorimetric region a1 on the reference surface r1 when the first opposing member 81 presses the reference surface r1 is indicated by a broken line circle.

Figure 8:
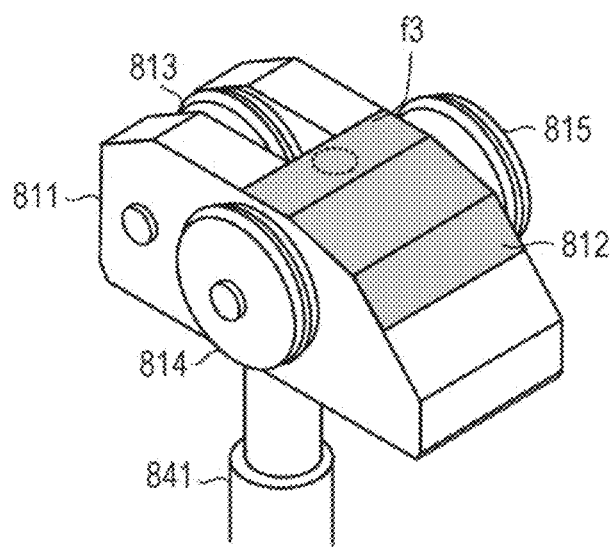
FIG. 8 is a perspective view of another example of the first opposing member.

FIG. 8 is a perspective view of another example of the first opposing member. The first opposing member 81 may have rollers 813 to 815 which rotate together with the paper S by contact. An imaginary plane connecting upper ends of the rollers 813 to 815 is slightly higher than an upper surface of the back surface sheet 812. For example, this imaginary plane is higher by approximately 0.1 to 0.2 mm than the upper surface of the back surface sheet 812. As a result, the paper S is pressed by point contact by the upper ends of the rollers 813 to 815. Then, the paper S abuts the reference surface r1, and the surface subjected to the colorimetry is arranged in the colorimetric region a1. Also, the back surface sheet 812 is arranged on the side of the surface opposite to the surface subjected to the colorimetry of the paper S. At that time, the back surface sheet 812 approaches the reference surface r1 with a predetermined distance therebetween. The predetermined distance may be, for example, the sum of the difference in height (approximately 0.1 to 0.2 mm) between the imaginary plane connecting the upper ends of the rollers 813 to 815 and the upper surface of the back surface sheet 812 and the thickness of the paper S. Since the paper S is pressed by point contact by each upper end of the rollers 813 to 815, when the paper S is supported from the side of the surface opposite to the surface subjected to the colorimetry, the back surface sheet 812 and the paper S are not in contact or are in slight contact with each other. As a result, it is possible to prevent the back surface sheet 812 from becoming dirty or worn due to friction with the paper S.

Figure 9:
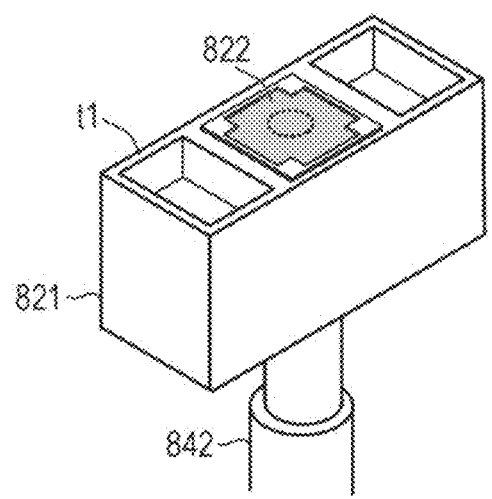
FIG. 9 is a perspective view of a second opposing member.

FIG. 9 is a perspective view of the second opposing member. The second opposing member 82 includes a base 821 engaged with the support column 842 and a reference plate 822 forming a calibrating member. A height of a pressing surface t1 which is an upper end of the base 821 is set to the same height as that of the reference plate 822.

The second opposing member 82 presses the reference surface r1 with the pressing surface t1 having the reference plate 822. As a result, the reference plate 822 is arranged in the colorimetric region a1. At that time, since the reference plate 822 is arranged in the opening b1, this does not abut (contact with) the reference surface r1. The pressing surface t1 may have a rectangular shape with a long side and a short side longer than the diameter of the circular opening b1, for example. That is, the pressing surface t1 is larger than the opening b1. However, if the pressing surface t1 has such a size and a shape that the second opposing member 82 may press the reference surface r1 without slipping through the opening b1 when trying to press the reference surface r1, there is no limitation. That is, the pressing surface t1 may have a rectangular shape with one of the long side and the short side longer than the diameter of the circular opening b1, for example. In FIG. 9, a position on the reference plate 822 arranged in the colorimetric region a1 on the reference surface r1 when the pressing surface t1 of the second opposing member 82 presses the reference surface r1 is indicated by a broken line circle.

The reference plate 822 is, for example, a ceramic plate having a uniform color, and its color value (for example, color data of the XYZ color system) is known and stored in the storage unit 20. The spectrocolorimeter 70 performs the colorimetry of the reference plate 822 and calibrates the spectrocolorimeter 70 by comparing the colorimetric value with the color value of the reference plate 822.

Figure 10:
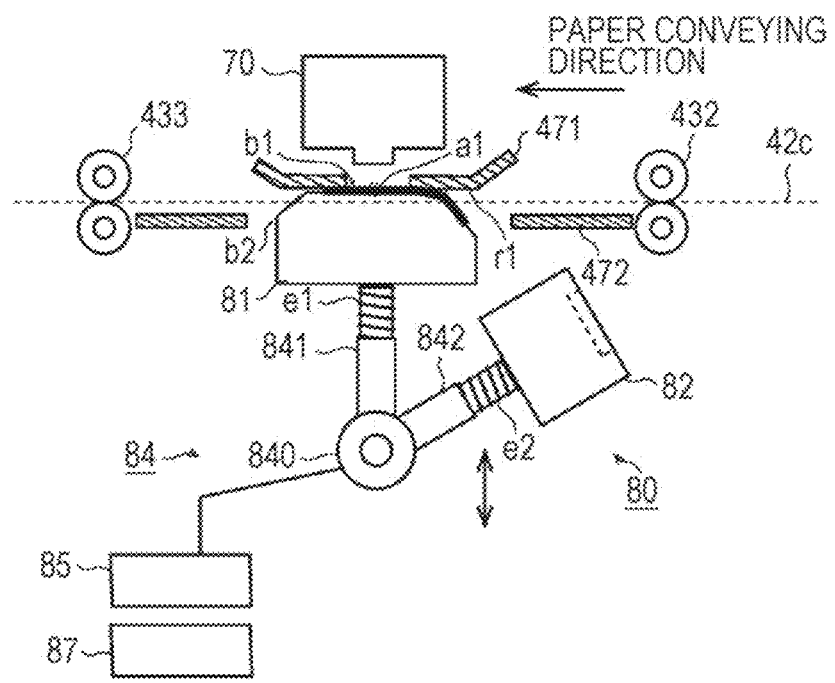
FIG. 10 is an explanatory view illustrating the opposing unit when the first opposing member is in a pressing position.
Figure 11:
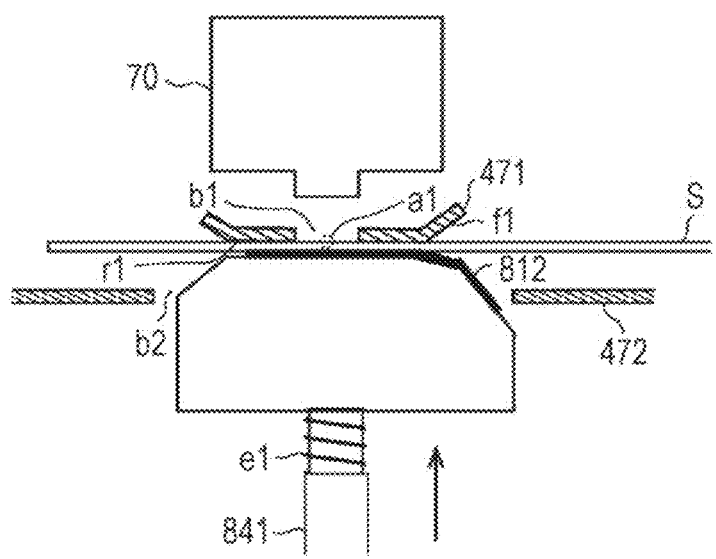
FIG. 11 is an explanatory view illustrating a state in which the first opposing member in the pressing position presses a reference surface via paper.

With reference to FIGS. 10 and 11, pressing operation by the first opposing member 81 and the second opposing member 82 and switching operation of the opposing members are described. FIG. 10 is an explanatory view illustrating an opposing unit when the first opposing member is in the pressing position. FIG. 11 is an explanatory view illustrating a state in which the first opposing member in the pressing position presses the reference surface via the paper.

With reference to FIG. 3 again, a state is illustrated in which the first opposing member 81 and the second opposing member 82 are arranged in the retracted position and the first opposing member 81 is switched to the position opposed to the spectrocolorimeter 70. The first opposing member 81 is switched to the position opposed to the spectrocolorimeter 70 by rotating around the rotary shaft 840 by rotary operation of the rotary shaft 840.

From the state illustrated in FIG. 3, by moving the first opposing member 81 in a direction approaching the first guide plate 471 by moving operation of the rotary shaft 840, the first opposing member may be moved to the pressing position where the reference surface r1 is pressed.

The first opposing member 81 is arranged in the pressing position in a first mode in which the spectrocolorimeter 70 performs the colorimetry on the patch image on the paper S.

As illustrated in FIG. 10, the first opposing member 81 arranged in the pressing position is urged toward the reference surface r1 by the elastic member e1, thereby pressing the reference surface r1 by utilizing the elastic force of the elastic member e1.

A conveyance speed of the paper S in the first mode may be set to the conveyance speed for color adjustment lower than that in normal printing. The conveyance speed for color adjustment may be set, for example, to 490 mm/sec. The colorimetry of the patch image in the first mode is performed on the paper S being conveyed at the conveyance speed for color adjustment without stopping the paper S.

As illustrated in FIG. 11, when the paper S is conveyed on the conveyance path 42c in a state in which the first opposing member 81 is arranged in the pressing position, the first guide plate 471 guides the paper S to the colorimetric region a1 on the reference surface r1 by the inclined surface f1 and the reference surface r1. A pressing force applied to the reference surface r1 by the first opposing member 81 is set such that this does not cause obstruction for the paper S to be conveyed between the first opposing member 81 and the first guide plate 471 at the conveyance speed in the first mode. The first opposing member 81 presses the reference surface r1 via the paper S guided by the first guide plate 471 so as to allow the paper S to abut the reference surface r1. As a result, the paper S is arranged in the colorimetric region a1.

Figure 12:
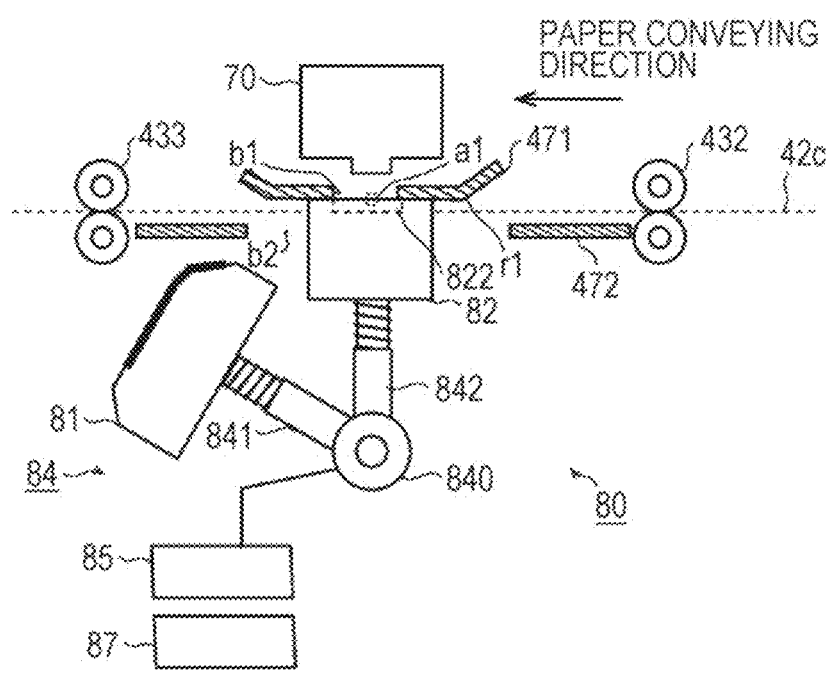
FIG. 12 is an explanatory view illustrating the second opposing member in a pressing position.

FIG. 12 is an explanatory view illustrating the second opposing member in the pressing position. The member mover 85 switches the position of the second opposing member 82 in the retracted position to a position opposed to the spectrocolorimeter 70 by rotating the rotary shaft 840, and then moves the same in a direction approaching the first guide plate 471 to move to the pressing position.

The second opposing member 82 is urged toward the reference surface r1 by the elastic member e2 in the pressing position, thereby pressing the reference surface r1 by utilizing the elastic force of the elastic member e2. In this state, as the pressing surface t1 of the second opposing member 82 abuts the reference surface r1, the reference plate 822 is arranged in the colorimetric region a1.

The second opposing member 82 is arranged in the pressing position in a second mode in which the colorimetry is performed on the reference plate 822 by the spectrocolorimeter 70.

The detector 87 detects the position of the second opposing member 82. The detector 87 may include a laser diode (LD) that applies light so as to be blocked only by any part of the second opposing member 82 arranged in the pressing position and a photo diode (PD) that detects the light, for example. It is possible to detect that the second opposing member 82 is arranged in the pressing position by detecting that the light emitted from the LD is blocked on the basis of output current of the PD. The detector 87 may also detect the position of the second opposing member 82 on the basis of a control signal for the member mover 85 to control the holding member 84. As described later, when the controller 10 determines that the second opposing member 82 is in the pressing position on the basis of a detection result of the detector 87, this stops the conveyance of the paper S by the paper feeder/conveyor 40.

Operation of an image reading system is described.

Figure 13:
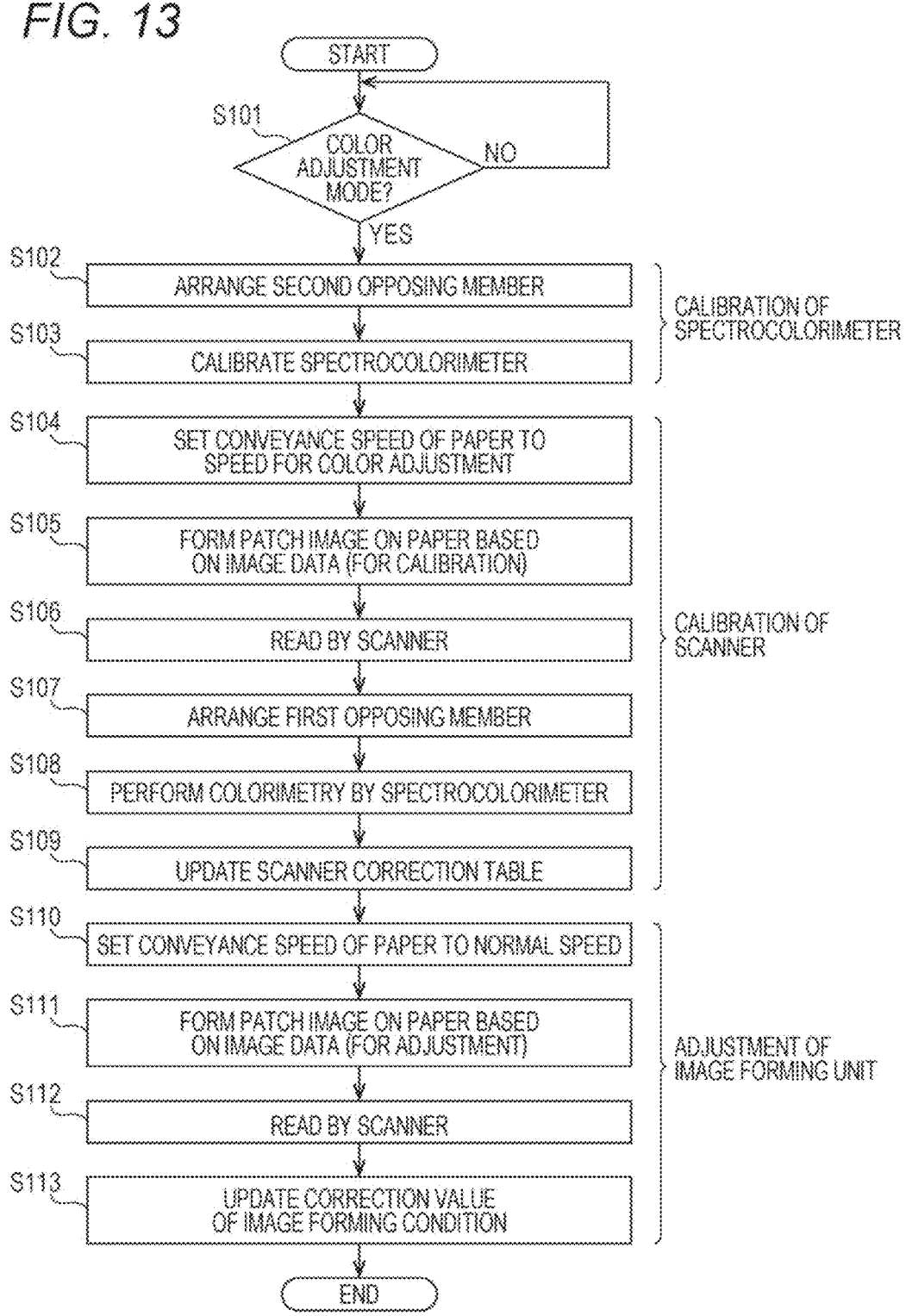
FIG. 13 is a flowchart of operation of an image reading system.

FIG. 13 is a flowchart of the operation of the image reading system. This flowchart may be executed by the controller 10 according to a program. Meanwhile, for simplifying description, a case of single-sided printing is hereinafter described as an example.

The controller 10 determines whether to execute a color adjustment mode (S101). The color adjustment mode is a mode in which calibration of the spectrocolorimeter 70, calibration of the scanner 60, and adjustment of the image forming unit 30 are executed. An execution timing of the color adjustment mode may be set to every time before the execution of the print job is started or may be set to every time a predetermined period (for example, 24 hours) elapses. The execution timing setting is stored in the storage unit 20.

In a case of executing the color adjustment mode (S101: YES), the controller 10 advances the procedure to a next step.

The calibration of the spectrocolorimeter 70 is executed at steps S102 to S103.

The controller 10 arranges the second opposing member 82 in the pressing position (S102). Specifically, the controller 10 controls the member mover 85, thereby rotary moving the second opposing member 82 in the retracted position to switch the opposing position of the spectrocolorimeter 70, and moves the same in a direction to approach the first guide plate 471 and arranges the second opposing member 82 in the pressing position. As a result, the reference plate 822 of the second opposing member 82 is arranged in the colorimetric region a1. The position of the second opposing member 82 arranged in the pressing position is detected by the detector 87. In a case where the controller determines that the second opposing member 82 is arranged in the pressing position and the second opposing member 82 presses the reference surface r1 on the basis of the detection result of the detector 87, this stops the conveyance of the paper S by the paper feeder/conveyor 40.

The controller 10 calibrates the spectrocolorimeter 70 (S103). Specifically, the reference plate 822 arranged in the colorimetric region a1 is subjected to the colorimetry by the spectrocolorimeter 70, the colorimetric value is compared with the color value of the reference plate read from the storage unit 20, and the spectrocolorimeter 70 is calibrated by correcting in accordance with difference therebetween.

At steps S104 to S109, the scanner 60b is calibrated.

The controller 10 sets the conveyance speed of the paper S to the conveyance speed for color adjustment (S104). In a case where the controller 10 determines that the second opposing member 82 is not arranged in the pressing position on the basis of the detection result by the detector 87, this starts conveying the paper S.

Using the image data of the patch image for calibration stored in the storage unit 20, the controller 10 forms the patch image for calibration on the paper S by the image forming unit 30 (S105). The patch image is formed in a position corresponding to the colorimetric region a1 of the spectrocolorimeter 70, for example, in the center position in the width direction. It is preferable that a plurality of colors of the patch image is distributed over an entire color gamut that the image forming unit 30 may output.

The controller 10 reads the patch image formed on the paper S at step S105 with the scanner 60b (S106).

The controller 10 arranges the first opposing member 81 in the pressing position (S107). Specifically, the controller 10 controls the member mover 85, thereby arranging the first opposing member 81 and the second opposing member 82 in the retracted position. Thereafter, the first opposing member 81 in the retracted position is rotary moved in the opposing position of the spectrocolorimeter 70 and is moved in the direction approaching the first guide plate 471, so that the first opposing member 81 is arranged in the pressing position.

The controller 10 conveys the paper S to the colorimetric region a1. At that time, the conveyed paper S enters between the first guide plate 471 and the first opposing member 81 against the elastic force of the elastic member e1. As a result the first opposing member 81 presses the reference surface r1 via the paper S, so that the paper S abuts the reference surface r1 and is arranged in the colorimetric region a1 in the opening b1 on the reference surface r1.

The controller 10 performs colorimetry on the patch image formed on the paper S at step S105 by the spectrocolorimeter 70 (S108).

The controller 10 compares the image data read at step S106 with the colorimetric value obtained at step S108 in the same color system to determine the correction value of the scanner 60b and updates a correction table (S109). This correction table is, for example, a multidimensional look-up table (LUT) for converting a read signal of the scanner 60b into color data.

At steps S110 to S113, the image forming condition of the image forming unit 30 is adjusted.

The controller 10 sets the conveyance speed of the paper S to the conveyance speed at the time of normal printing (S110).

The controller 10 forms the patch image on the paper S by the image forming unit 30 using the image data of the patch image for adjusting the image forming condition stored in the storage unit 20 (S111). This patch image is, for example, a plurality of patch images in which density is changed at plural stages for each basic color over the entire surface of the paper S.

The controller 10 reads the patch image formed on the paper S at step S111 by the scanner 60b (S112).

The controller 10 updates the correction value of the image forming condition by the image forming unit 30 on the basis of the image data read at step S112. That is, a process condition of the image forming unit 30 such as an output of the writing unit 34, an output of a developing bias applied to a developing roller of the developing unit 33 and the like are adjusted (S113).

This embodiment has the following effects.

An opening is provided on a reference surface of a guide member which guides conveyed paper, and a colorimetric range away from the colorimeter by a certain distance is set in the opening on the reference surface. Then, by allowing the paper and the calibrating member subjected to the colorimetry to appropriately abut tire reference surface, they are arranged in the colorimetric range and are subjected to the colorimetry. As a result, it is possible to set a distance between the paper and the calibrating member to be subjected to the colorimetry and the colorimeter with high precision.

Furthermore, a member mover is provided which moves a first opposing member and a second opposing member corresponding to a first mode in which the colorimetry is performed on the image on the paper and a second mode in which the colorimetry is performed on the calibrating member. The first opposing member is rotated around a rotary shaft to be switched to a position opposed to the colorimeter across a first opening, and then the first opposing member is moved in the direction approaching the first guide member to press the reference surface corresponding to the first mode. Then, the second opposing member is rotated around the rotary shaft to be switched to the position in winch the pressing surface is opposed to the colorimeter across the first opening, and then this is moved in the direction approaching the first guide member to press the reference surface by the pressing surface corresponding to the second mode. Accordingly, by moving the opposing members by the common member mover, the paper and the calibrating member may be arranged in the colorimetric range with higher accuracy.

Furthermore, the first opposing member is provided with a background surface in a background color used as a background at the time of colorimetry of the paper by being arranged on the side of the surface opposite to the surface subjected to the colorimetry of the paper. When the first opposing member presses the first guide member, the background surface abuts the reference surface or approaches the reference surface with a predetermined distance therebetween. This makes it possible to more easily arrange the surface of the background color on the surface opposite to the surface on which the colorimetry is performed of the paper at the time of colorimetry of the paper.

Furthermore, the surface of the first opposing member pressing the first guide member and the pressing surface of the second opposing member are made larger than the first opening. Accordingly, by pressing the reference surface by the opposing members more certainly, the paper and the calibrating member may be arranged in the colorimetric range with higher accuracy.

Furthermore, the reference surface is pressed by utilizing the elastic force by each opposing member. As a result, wear of the pressing surface with the reference surface of the opposing member may be inhibited, and the paper may easily pass between the first guide member and the first opposing member, so that occurrence of jamming of the paper may be inhibited.

Furthermore, a detector which detects the position of the second opposing member is provided, and when it is determined on the basis of the detected position of the second opposing member that the second opposing member presses the reference surface, the conveyance of the paper is stopped. This makes it possible to prevent the calibrating member from becoming dirty and scratched due to contact of the paper conveyed at the time of colorimetry of the calibrating member with the calibrating member and to inhibit deterioration in colorimetric accuracy caused by a dirty calibrating member and the like.

Furthermore, the image reading apparatus is calibrated on the basis of the colorimetric value of the calibrating member subjected to the colorimetry by the colorimeter, and the scanner is calibrated on the basis of the colorimetric value of the image on which the colorimetry is performed by the calibrated image reading apparatus and the image data of the image obtained by the scanner. As a result, calibration of the colorimeter and the scanner may be performed more smoothly and with higher accuracy.

Second Embodiment

An image reading apparatus, an image forming system, and a program for image reading apparatus according to a second embodiment of the present invention are described. This embodiment is different from the first embodiment in following points. That is, in this embodiment, an opposing unit 80 is further provided with an opening blocking member 83 for blocking an opening b2 provided on a second guide plate 472. In other respects, this embodiment is similar to the first embodiment, so that redundant descriptions are omitted or simplified.

Figure 14:
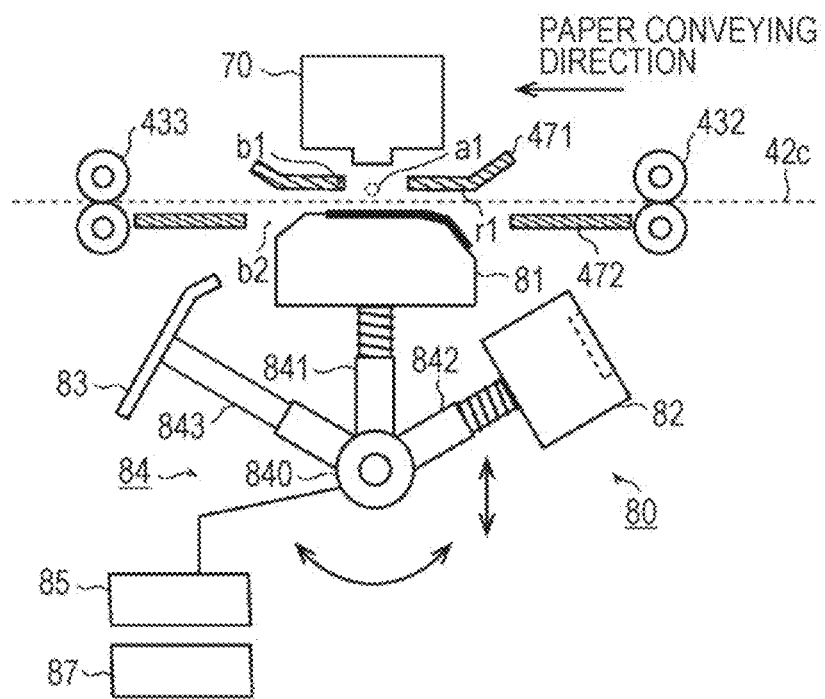
FIG. 14 is an explanatory view illustrating a configuration of a spectrocolorimeter and an opposing unit.
Figure 15:
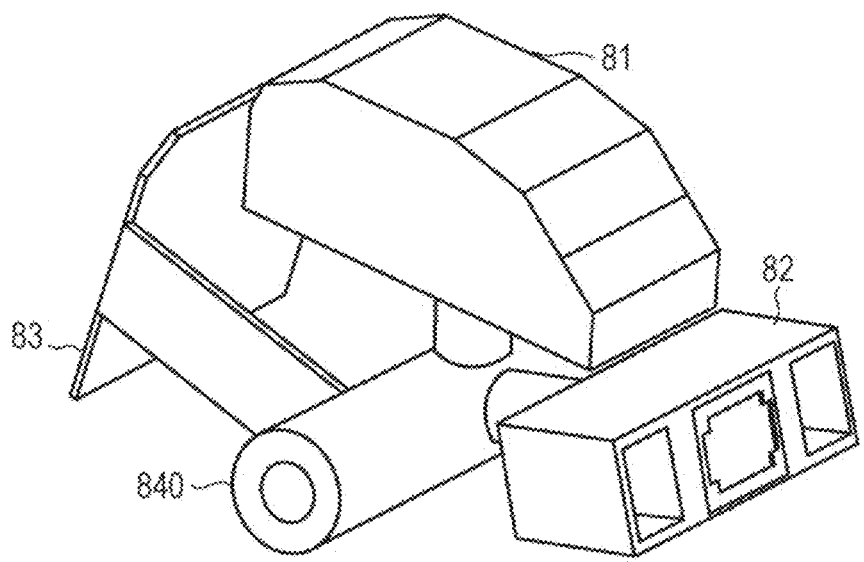
FIG. 15 is a perspective view illustrating a configuration of an opposing member and a rotary shaft included in the opposing unit.

With reference to FIGS. 14 and 15, a configuration of the opposing unit 80 is described. FIG. 14 is an explanatory view illustrating a configuration of a spectrocolorimeter and the opposing unit. FIG. 15 is a perspective view illustrating a configuration of an opposing member and a rotary shaft included in the opposing unit.

The opposing unit 80 includes a first opposing member 81, a second opposing member 82, an opening blocking member 83, a holding member 84 which holds them, a member mover 85, and a detector 87 which detects a position of the second opposing member 82.

The holding member 84 includes a rotary shaft 840, support columns 841 to 843, and elastic members e1 and e2. The opening blocking member 83 is provided on a tip end of the support column 843.

Figure 16:
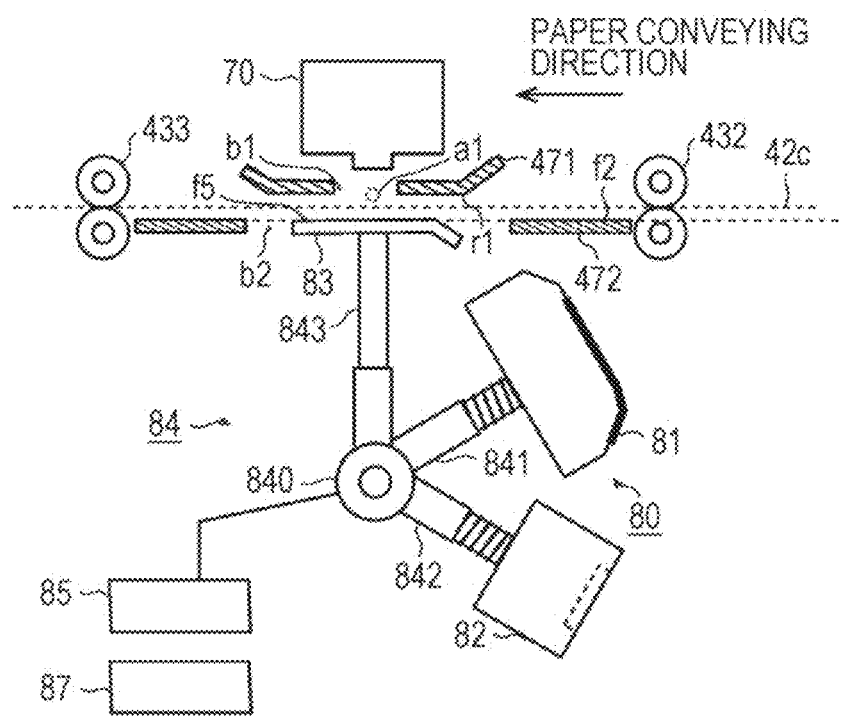
FIG. 16 is an explanatory view illustrating an opening blocking member in an opening blocking position.

The member mover 85 is formed of the driving motor and a transmitting mechanism including a gear and the like for transmitting power from the driving motor to the rotary shaft 840 (none of which is illustrated), and performs rotary movement and vertical movement of the holding member 84. Specifically, the member mover 85 rotates the rotary shaft 840 by a predetermined angle as the rotary movement, and the first opposing member 81, the second opposing member 82, and the opening blocking member 83 to be arranged in a position opposed to the spectrocolorimeter 70 are switched. Also, after the rotary movement, the rotary shaft 840 is moved up and down to a first position close to the first guide plate 471 and a second position far from the first guide plate 471. As the rotary shaft 840 moves to the first position, the first opposing member 81 or the second opposing member 82 moves through the opening b2 and is arranged in a pressing position, and the opening blocking member 83 moves through the opening b2 and is arranged in an opening blocking position. The opening blocking position is the position of the opening blocking member 83 a predetermined distance away from a reference surface r1. As illustrated in FIG. 16 to be described later, for example, the position a predetermined distance away from the reference surface r1 is a position in which an upper surface f5 of the opening blocking member 83 opposed to the first guide plate 471 is flush with an upper surface f2 of the second guide plate 472. The opening blocking position may be a position in which the upper surface f5 of the opening blocking member 83 is closer to the first guide plate 471 than the upper surface f2 of the second guide plate 472 as long as this does not obstruct conveyance of the paper S conveyed on a conveyance path 42c. Similarly, the opening blocking position may be a position in which the upper surface f3 of the opening blocking member 83 is farther from the first guide plate 471 than the upper surface f2 of the second guide plate 472 as long as this does not obstruct the conveyance of the paper S conveyed on the conveyance path 42c. The opening blocking member 83 is arranged in the opening blocking position to block at least a part of the opening b2. As the rotary shaft 840 moves to the second position, the first opposing member 81, the second opposing member 82, and the opening blocking member 83 are arranged in a retracted position. The retracted position is the position of the first opposing member 81, the second opposing member 82, and the opening blocking member 83 arranged on the opposite side of the first guide plate 471 across the conveyance path 42c. In FIG. 14, a state in which the first opposing member 81, the second opposing member 82, and the opening blocking member 83 are arranged in the retracted position, and the first opposing member 81 is opposed to the spectrocolorimeter 70.

FIG. 16 is an explanatory view illustrating the opening blocking member in the opening blocking position. The member mover 85 switches the position of the opening blocking member 83 in the retracted position to a position opposed to the spectrocolorimeter 70 by rotating the rotary shaft 840, and then moves the same in a direction approaching the first guide plate 471 to move to the opening blocking position. At that time, the first opposing ember 81 and the second opposing member 82 are arranged on the opposite side of the conveyance path 42c across the second guide plate 472.

The opening blocking member 83 is arranged in the opening blocking position in a third mode in which the colorimetry is not performed by the spectrocolorimeter 70.

Operation of an image reading system is described.

Figure 17:
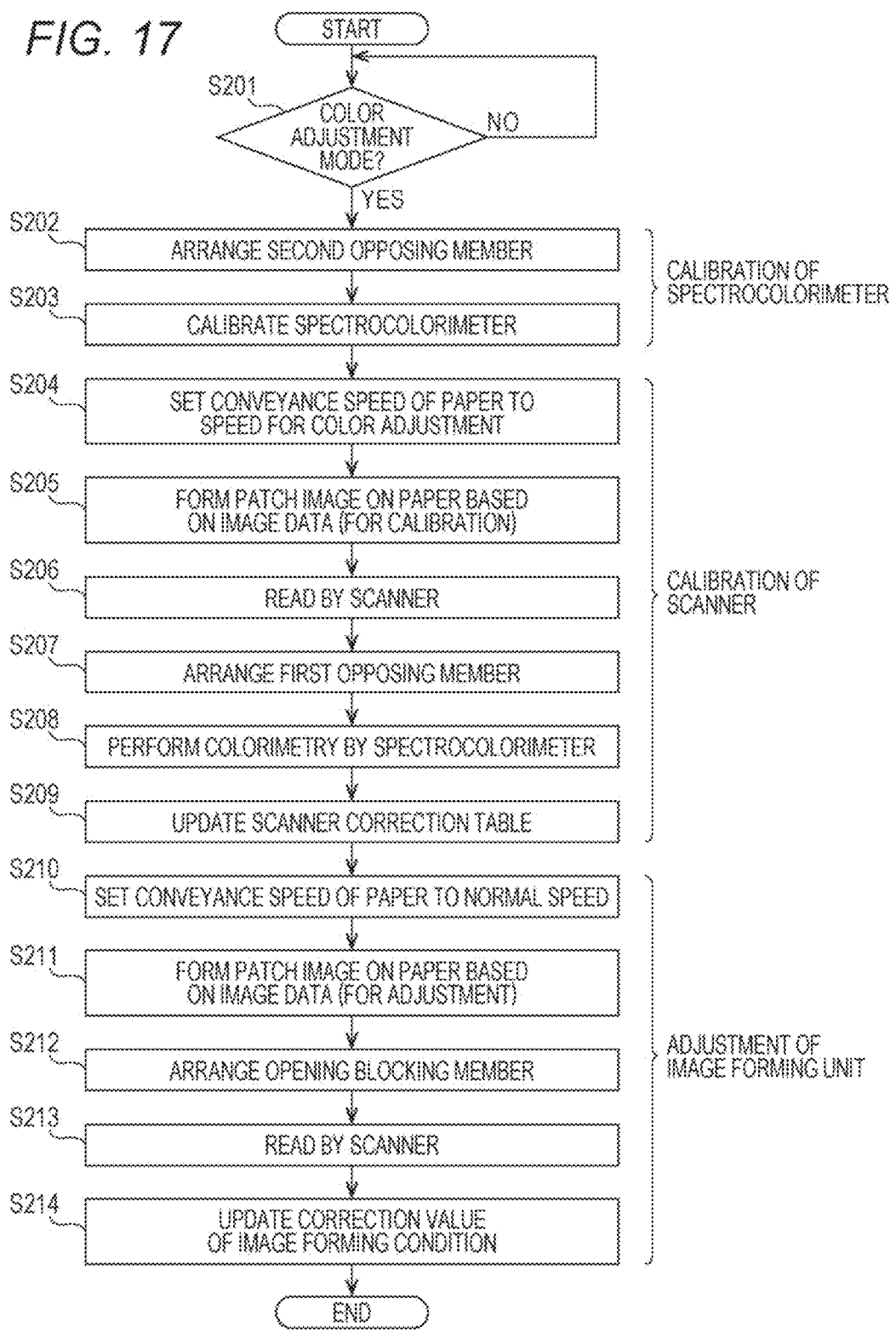
FIG. 17 is a flowchart of operation of an image reading system.

FIG. 17 is a flowchart of the operation of the image reading system. This flowchart may be executed by the controller 10 according to a program. Meanwhile, steps S201 to S209 are similar to corresponding steps S101 to S109 of the first embodiment, so that the description thereof is omitted.

The controller 10 sets a conveyance speed of the paper S to the conveyance speed at the time of normal printing (S210).

The controller 10 forms a patch image on the paper S by the image forming unit 30 using image data of the patch image for adjusting an image forming condition stored in a storage unit 20 (S211).

The controller 10 arranges the opening blocking member 83 in the opening blocking position (S212). Meanwhile, this step may also be executed before step S211 or in parallel with step S211.

The controller 10 reads the patch image formed on the paper S at step S211 by a scanner 60b (S213).

The controller 10 updates a correction value of the image forming condition by the image forming unit 30 on the basis of the image data read at step S213 (S214).

In addition to the effects of the first embodiment, this embodiment further exhibits the following effects.

A second guide member including a second opening on a surface opposed to a reference surface of a first guide member across a conveyance path with a predetermined interval therebetween, and an opening blocking member moving through the second opening are provided. A first opposing member and a second opposing member are moved through the second opening on the opposite side of the conveyance path across the second guide member and the opening blocking member is moved through the second opening to a position away from the reference surface by a predetermined distance corresponding to a third mode in which colorimetry by a colorimeter is not performed. This makes it possible to prevent the opposing member from becoming dirty and scratched due to contact with conveyed paper when colorimetry by a colorimeter is not performed. It is also possible to prevent damage and jamming of the paper due to catching of the paper in the second opening.

Furthermore, the second opening is provided in a position opposed to the colorimeter across a first opening of the second guide member. The opposing member is rotated around a rotary shaft to be switched to a position opposed to the colorimeter across the first opening, and then the opposing member is moved in the direction approaching the first guide member through the second opening to press the reference surface corresponding to each mode. The opening blocking member is rotated around a rotary shaft to be switched to a position opposed to the colorimeter across a first opening, and then the opening blocking member is moved in the direction approaching the first guide member through the second opening to be arranged in the position predetermined distance away from the reference surface. Accordingly, by moving each opposing member by common member moving means, the paper and the calibrating member may be arranged in a colorimetric range with higher accuracy. Also, it is possible to prevent the opposing member from becoming dirty and scratched due to contact with the conveyed paper by a simpler and minimal member and prevent damage and jamming of the paper due to catching of the paper in the second opening.

Furthermore, a position away from the reference surface by a predetermined distance in which the opening blocking means is arranged is made a position in which a surface opposed to the first guide member of the opening blocking member is flush with a surface opposed to the reference surface across the conveyance path of the second guide member. As a result, the opposing member may be more effectively prevented from becoming dirty and scratched due to contact with the conveyed paper and damage and jamming of the paper due to catching of the paper in the second opening may be prevented.

The image reading apparatus, the image forming system, and the program for image reading apparatus according to the present invention are not limited to the above-described embodiments.

For example, in the above-described embodiment, the second opening is provided in the position opposed the colorimeter across the first opening of the second guide member. However, the position of the second opening is not limited as long as the opposing member may be arranged in the pressing position through the second opening.

In the embodiment, a part or an entire processing executed by a program may be replaced with hardware such as a circuit to be performed.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus comprising:
   a conveyor that conveys paper on which an image is formed along a conveyance path;
   a first guide member including a first opening on a reference surface opposed to the conveyance path that guides the conveyed paper;
   a first opposing member that arranges the image on the paper in a colorimetric range set in the first opening on the reference surface by pressing the reference surface via the paper guided by the first guide member to allow the paper to abut the reference surface;
   a second opposing member that presses the reference surface by a pressing surface including a calibrating member in a reference color to arrange the calibrating member in the colorimetric range;
   a colorimeter arranged on a side opposite to the conveyance path across the first guide member that performs colorimetry on the image on the paper and the calibrating member arranged in the colorimetric range, and
   a member mover that moves the first opposing member and the second opposing member corresponding to a first mode in which the colorimetry is performed on the image on the paper by the colorimeter and a second mode in which the colorimetry is performed on the calibrating member by the colorimeter, wherein
   the member mover rotates the first opposing member around a rotary shaft to switch a position of the first opposing member to a position opposed to the colorimeter across the first opening, then moves the first opposing member in a direction approaching the first guide member to allow the first opposing member to press the reference surface corresponding to the first mode, and rotates the second opposing member around the rotary shaft to switch a position of the second opposing member to a position in which the pressing surface is opposed to the colorimeter across the first opening, then moves the second opposing member in a direction approaching the first guide member to allow the second opposing member to press the reference surface by the pressing surface corresponding to the second mode.

2. The image reading apparatus according to claim 1, further comprising:
   a second guide member including a second opening on a surface opposed to the reference surface with a predetermined interval therebetween across the conveyance path that guides the paper; and
   an opening blocking member that moves through the second opening,
   wherein the member mover moves the first opposing member and the second opposing member through the second opening such that the first opposing member and the second opposing member are arranged on a side opposite to the conveyance path across the second guide member and moves the opening blocking member to a position away from the reference surface by a predetermined distance through the second opening corresponding to a third mode in which the colorimetry by the colorimeter is not performed.

3. The image reading apparatus according to claim 2, wherein the second opening is provided in a position opposed to the colorimeter across the first opening of the second guide member, and
   the member mover rotates the first opposing member around a rotary shaft to switch a position of the first opposing member to a position opposed to the colorimeter across the first opening, then moves the first opposing member in a direction approaching the first guide member through the second opening to allow the first opposing member to press the reference surface corresponding to the first mode, rotates the second opposing member around the rotary shaft to switch a position of the second opposing member to a position in which the pressing surface is opposed to the colorimeter across the first opening, then moves the second opposing member in a direction approaching the first guide member through the second opening to allow the second opposing member to press the reference surface by the pressing surface corresponding to the second mode, and rotates the opening blocking member around the rotary shaft to switch a position of the opening blocking member to a position opposed to the colorimeter across the first opening, then moves the opening blocking member in a direction approaching the first guide member through the second opening to arrange the opening blocking member in a position away from the reference surface by a predetermined distance corresponding to the third mode.

4. The image reading apparatus according to claim 1, wherein the first opposing member includes a background surface in a background color arranged on a side of a surface opposite to a surface subjected to the colorimetry of the paper to be used as a background at the time of the colorimetry of the paper, and the background surface abuts the reference surface or approaches the reference surface with a predetermined distance therebetween when the first opposing member presses the first guide member.

5. The image reading apparatus according to claim 1, wherein a surface of the first opposing member that presses the first guide member and the pressing surface of the second opposing member are larger than the first opening.

6. The image reading apparatus according to claim 3, wherein the position away from the reference surface by a predetermined distance is a position in which a surface opposed to the first guide member of the opening blocking member is flush with a surface opposed to the reference surface across the conveyance path of the second guide member.

7. The image reading apparatus according to claim 1, wherein the first opposing member presses the reference surface by utilizing an elastic force of a first elastic member, and the second opposing member presses the reference surface by utilizing an elastic force of a second elastic member.

8. The image reading apparatus according to claim 1, further comprising:
a detector that detects a position of the second opposing member; and
a hardware processor that prohibits conveyance of the paper by the conveyor when determining that the second opposing member presses the reference surface on the basis of the detected position of the second opposing member.

9. An image forming system comprising:
an image forming device that forms an image on paper; and
an image reading apparatus that performs colorimetry on the image on the paper and a calibrating member in a reference color,
wherein the image reading apparatus includes:
a conveyor that conveys the paper on which the image is formed along a conveyance path;
a first guide member including a first opening on a reference surface opposed to the conveyance path that guides the conveyed paper;
a first opposing member that arranges the image on the paper in a colorimetric range set in the first opening on the reference surface by pressing the reference surface via the paper guided by the first guide member to allow the paper to abut the reference surface;
a second opposing member that presses the reference surface by a pressing surface including the calibrating member to arrange the calibrating member in the colorimetric range;
a colorimeter arranged on a side opposite to the conveyance path across the first guide member that performs colorimetry on the image on the paper and the calibrating member arranged in the colorimetric range;
a scanner that obtains image data by reading the image on the paper;
a calibrator that calibrates the colorimeter on the basis of a colorimetric value of the calibrating member subjected to the colorimetry and calibrates the scanner on the basis of a colorimetric value of the image on the paper subjected to the colorimetry by the image reading apparatus after the calibration and the image data of the image obtained by the scanner; and
a member mover that moves the first opposing member and the second opposing member corresponding to a first mode in which the colorimetry is performed on the image on the paper by the colorimeter and a second mode in which the colorimetry is performed on the calibrating member by the colorimeter, wherein
the member mover rotates the first opposing member around a rotary shaft to switch a position of the first opposing member to a position opposed to the colorimeter across the first opening, then moves the first opposing member in a direction approaching the first guide member to allow the first opposing member to press the reference surface corresponding to the first mode, and rotates the second opposing member around the rotary shaft to switch a position of the second opposing member to a position in which the pressing surface is opposed to the colorimeter across the first opening, then moves the second opposing member in a direction approaching the first guide member to allow the second opposing member to press the reference surface by the pressing surface corresponding to the second mode.

10. The image forming system according to claim 9, wherein the image reading apparatus further includes:
a second guide member including a second opening on a surface opposed to the reference surface with a predetermined interval therebetween across the conveyance path that guides the paper; and
an opening blocking member that moves through the second opening, and
the member mover moves the first opposing member and the second opposing member through the second opening such that the first opposing member and the second opposing member are arranged on a side opposite to the conveyance path across the second guide member and moves the opening blocking member to a position away from the reference surface by a predetermined distance through the second opening corresponding to a third mode in which the colorimetry by the colorimeter is not performed.

11. The image forming system according to claim 10,
wherein the second opening is provided in a position opposed to the colorimeter across the first opening of the second guide member, and
the member mover rotates the first opposing member around a rotary shaft to switch a position of the first opposing member to a position opposed to the colorimeter across the first opening, then moves the first opposing member in a direction approaching the first guide member through the second opening to allow the first opposing member to press the reference surface corresponding to the first mode, rotates the second opposing member around the rotary shaft to switch a position of the second opposing member to a position in which the pressing surface is opposed to the colorimeter across the first opening, then moves the second opposing member in a direction approaching the first guide member through the second opening to allow the second opposing member to press the reference surface by the pressing surface corresponding to the second mode, and rotates the opening blocking member around the rotary shaft to switch a position of the opening blocking member to a position opposed to the colorimeter across the first opening, then moves the opening blocking member in a direction approaching the first guide member through the second opening to arrange the opening blocking member in a position away from the reference surface by a predetermined distance corresponding to the third mode.

12. The image forming system according to claim 9,
wherein the first opposing member includes a background surface in a background color arranged on a side of a surface opposite to a surface subjected to colorimetry of the paper to be used as a background at the time of the colorimetry of the paper, and the background surface abuts the reference surface or approaches the reference surface with a predetermined distance therebetween when the first opposing member presses the first guide member.

13. The image forming system according to claim 11,
wherein the position away from the reference surface by a predetermined distance is a position in which a surface opposed to the first guide member of the opening blocking member is flush with a surface opposed to the reference surface across the conveyance path of the second guide member.

14. The image forming system according to claim 9,
wherein the image reading apparatus further includes:
a detector that detects a position of the second opposing member; and
a hardware processor that prohibits conveyance of the paper by the conveyor when determining that the second opposing member presses the reference surface on the basis of the detected position of the second opposing member.

15. A non-transitory recording medium storing a computer readable control program of an image reading apparatus including a conveyor that conveys paper on which an image is formed along a conveyance path, a first guide member including a first opening on a reference surface opposed to the conveyance path that guides the conveyed paper, a first opposing member that arranges the image on the paper in a colorimetric range set in the first opening on the reference surface by pressing the reference surface via the paper guided by the first guide member to allow the paper to abut the reference surface, a second opposing member that presses the reference surface by a pressing surface including a calibrating member in a reference color to arrange the calibrating member in the colorimetric range, and a colorimeter arranged on a side opposite to the conveyance path across the first guide member that performs colorimetry on the image on the paper and the calibrating member arranged in the colorimetric range, the program causing a computer to execute:
(a) arranging the calibrating member in the colorimetric range by pressing the reference surface by the pressing surface by the second opposing member corresponding to a second mode in which the colorimeter performs the colorimetry on the calibrating member;
(b) performing the colorimetry by the colorimeter on the calibrating member arranged in the colorimetric range in (a);
(c) arranging the image on the paper in the colorimetric range by pressing the reference surface via the paper by the first opposing member corresponding to a first mode in which the colorimeter performs the colorimetry on the image on the paper; and
(d) performing the colorimetry on the image on the paper arranged in the colorimetric range in (c),
wherein the image reading apparatus further includes a member mover that moves the first opposing member and the second opposing member;
the member mover rotates the first opposing member around a rotary shaft to switch a position of the first opposing member to a position opposed to the colorimeter across the first opening, then moves the first opposing member in a direction approaching the first guide member to allow the first opposing member to press the reference surface corresponding to the first mode, rotates the second opposing member around the rotary shaft to switch a position of the second opposing member to a position in which the pressing surface is opposed to the colorimeter across the first opening, then moves the second opposing member in a direction approaching the first guide member to allow the second opposing member to press the reference surface by the pressing surface corresponding to the second mode, and
the program causes the computer to execute:
(a) and (b) corresponding to the second mode; and
(c) and (d) corresponding to the first mode.

16. The non-transitory recording medium storing a computer readable control program according to claim 15,
wherein the image reading apparatus further includes a second guide member including a second opening on a surface opposed to the reference surface with a predetermined interval therebetween across the conveyance path that guides the paper, and
an opening blocking member that moves through the second opening,
the member mover moves the first opposing member and the second opposing member through the second opening such that the first opposing member and the second opposing member are arranged on a side opposite to the conveyance path across the second guide member and moves the opening blocking member to a position away from the reference surface by a predetermined distance through the second opening corresponding to a third mode in which colorimetry by the colorimeter is not performed, and
the program causes the computer to further execute
(e) moving the opening blocking member by the member mover to a position away from the reference surface by a predetermined distance by approaching the opening blocking member to the first guide member through the second opening corresponding to the third mode.

17. The non-transitory recording medium storing a computer readable control program according to claim 15,
wherein the image reading apparatus further includes a detector that detects a position of the second opposing member, and
causes the computer to further execute:
(f) detecting a position of the second opposing member by the detector; and
(g) prohibiting conveyance of the paper to the first guide member by the conveyor when determining that the second opposing member presses the first guide member on the basis of the detected position of the second opposing member.

* * * * *